United States Patent [19]
Tonjes, Jr.

[11] 3,742,688
[45] July 3, 1973

[54] RAKE ATTACHMENT FOR ROTARY MOWER

[76] Inventor: Henry B. Tonjes, Jr., Box 188, Wisner, Nebr. 68791

[22] Filed: Nov. 6, 1972

[21] Appl. No.: 304,120

[52] U.S. Cl.................. 56/193, 56/295, 56/367, 172/42
[51] Int. Cl............................................ A01d 43/02
[58] Field of Search ................ 56/17, 5, 16.1, 193, 56/16.6, 295, 367, 400.04; 172/42, 111

[56] References Cited
UNITED STATES PATENTS

| | | |
|---|---|---|
| 2,720,071 | 10/1955 | Watanabe........................... 56/16.6 |
| 3,015,929 | 1/1962 | Bright................................. 56/193 |
| 3,184,903 | 5/1965 | Fjelstad............................... 56/17.5 |
| 3,117,633 | 1/1964 | Hosek.................................. 172/42 |
| 3,367,093 | 2/1968 | Zwickel............................ 56/400.04 |
| 3,589,112 | 6/1971 | Frohmader......................... 56/295 |
| 3,611,691 | 10/1971 | Howard............................... 56/367 |

*Primary Examiner*—Russell R. Kinsey
*Attorney*—Lucas J. DeKoster

[57] ABSTRACT

A rotating power rake for use with a rotary mower including hinged tooth carriers adapted to be held in an operative position by aerodymanic forces.

8 Claims, 3 Drawing Figures

PATENTED JUL 3 1973   3,742,688

RAKE ATTACHMENT FOR ROTARY MOWER

BACKGROUND AND SUMMARY OF THE INVENTION

This device pertains to blades for rotary mowers and more particularly to a blade adapted to perform a raking function.

Much of he drudgery has been removed from lawn work with the advent of the power lawn mower. However, the raking of a lawn is still done principally by hand or is not done at all.

There have been occasional proposals to build power driven rakes. Those which are self contained are too expensive for the average householder, and those which have attempted to use the power unit of the lawn mower have been unsuccessful. Part of the problem has been that the raking member - usually a spring wire tooth or the like - has been so rigid that it dug into the lawn, or that it has been spring mounted and cracked off.

By my device I provide a powered rake attachment for a rotary lanw mower which utilizes aerodynamic forces to hold the raking member in contact with the lawn. This provides for relatively firm contact, but still allows quick and easy release where irregularities exist.

FIGURES

DESCRIPTION

Figure 1:
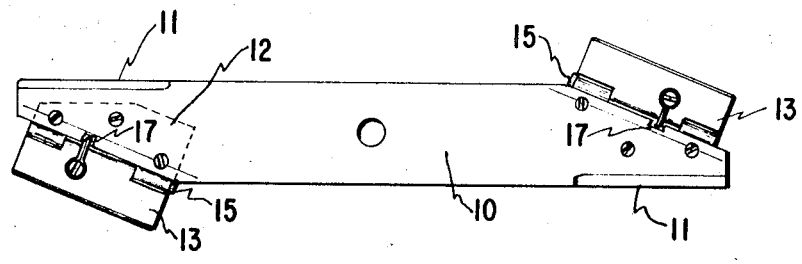
FIG. 1 is a top plan view of a cutter bar embodying my invention.

Briefly my invention comprises a raking means for attachment to a powered rotary mower including hinged means attached to the cutter bar. The hinged means includes a surface extending into the air stream around the bar so that there will be aerodynamic pressure on the surface to hold the raking member in contact with the lawn surface.

More specifically and referring to the drawings, my device is attached to a cutter bar 10 of the ordinary powered rotary lawn mower. This bar, as is well known, includes cutting edges 11 on what I prefer to call the leading edge fo the bar. The cutter, in plan form, may have a tapered trailing edge as shown in the figures or may be rectangular. In most instances there is a slight upward twist at the trailing edge designed to produce an upward flow of air. This air flow tends to pull the grass upright so that it can be cut more evenly and so that the cut ends are thrown out of the exit chute of the mower housing by the air stream.

My invention includes the idea of an attachment to the trailing edge of the cutter bar which will in no way interfere with the lifting or throwing action. In fact, it will ordinarily augment that action.

As shown in the figures, I attach a hinged member having a fixed part 12 and a flap member 13 to the trailing edge of the bar 10 near its outer end. Attachment of the fixed part may be made by screw threaded means such as bolts in order that the entire device can be removed, or it may be permanently attached by welding, spot welding or the like. The flp member 13 is preferably attached to the fixed part 12 by a hinge pin 14 having a head 15. This pin 14 should be removable, and therefore, the head 15 should be at the end of the pin closer to the center of rotation so that centirfugal force will not tend to remove the pin, but rather will tend to hold it in place.

Figure 2:
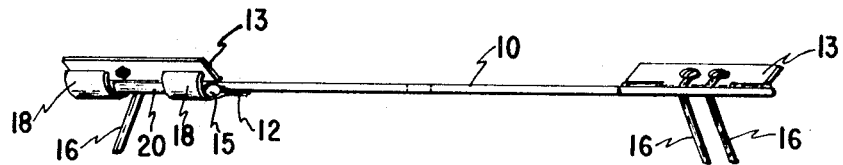
FIG. 2 is an elevational view of a cutter bar showing alternative forms of raking members.
Figure 3:
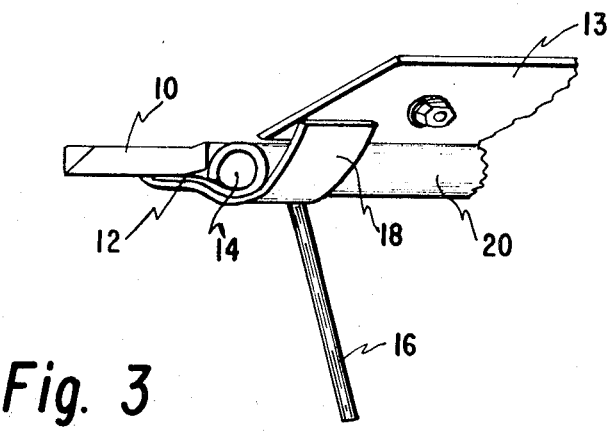
FIG. 3 is a pictorial view from the end of a cutter bar.

The operating mechansim of the rake includes one or more rake fingers 16 attached to a flap part 13 of each hinge. Preferably, these fingers extend through a notch 17 formed in the hinge and then extend along the upper surface of the flap 13 to the point where the finger is attached to the flap. It will be apparent that while two or more fingers could be attached as shown on the one end of the blade in FIG. 2 that a uniform number should be used on both ends to retain balance of the blade, and that the use of a single finger on one end of the blade with two or more at the other end should be avoided unless care is taken to otherwise balance the blade. It will also be evident that the fingers can be either permanently or releasably attached to the flap.

In order to hold the flap member 13 in its operating position, I provide stop members 18. These may be formed as a part of the fixed member 12 of the hinge, or may be attached thereto. They extend beneath the flap and are formed to prevent the flap from falling below a position in which the flap angles upward from the blade 10. Thus, there is always a raised trailing edge to the bar 10 at the radius of the hinge member.

This raised trailing edge augments the action of the uptilted trailing edge of the cutter bar 10, but also causes a force downward on the flap. The downward force pressing against the stop member 18 also tends to hold the rake finger or fingers 16 against the surface of the lawn being raked. Thus, while the cutter bar rotates, there is always a pressure on the finger which can readily be overcome if the finger hits an irregularity in the ground or some object on the ground. If that should happen, the blade will continue to rotate, and aerodynamic pressures will again quickly return the flap to its original position and raking will continue with only a very minimum of interruption.

If more or less pressure on the fingers 16 is desired, the stops 18 may be adjusted to hold the flap 13 at a steeper or less steep anlge to the blade. In that way the aerodynamic forces and therefore the force holding the finger down is controlled.

It is also possible to use the blade without using the rake simply by pulling out the hinge pin 14 from each hinge and removing the flaps 13 carrying the fingers 16. If desired, the entire mechanism may also be removed if bolts or the like are used as fasteners. However, the use of a removable hinge pin makes this mode of disassembly so easy that it is doubtful that removing the entire assembly would be chosen by most householders. In any event, it is desirable to keep the airflow over the upper surface reasonably smooth. Therefore, if screw or bolts are used to hold the fixed part 12 in place, I prefer that they be counter sunk into the blade and that the fixed part 12 be fastened to the lower side of the blade. The barrel part 20 of the hinge then should lie immediately adjacent to the edge of the blade, ad flap part 13 should be placed so that it preserves as nearly as possible a smooth path for airlow over the upper surface.

I claim:

1. For use on lawns, a rotary rake means comprising blade means adapted to be rotated, movable flap means attached to said blade means at a trailing edge thereof, said flap means being positioned to be pressed downwardly by aerodynamic forces generated by the rotation of said blade means, and finger means on said flap means adapted to touch said lawn, said aerodynamic foces being such as to press said finger means into contact with the lawn.

2. The device of claim 1 in which said flap means are removably attached to said blade means.

3. The device of claim 1 in which said flap means is a part of hinged means having a part fixed to said blade and a part movable relative thereto, said last named part forming the flap means.

4. The device of claim 3 in which said hinged means includes a removable pin adapted to hold said fixed part and said flap part in movable relationship to each other, said pin being removable to allow disassembly of said hinged means.

5. The device of claim 1 in which stop means are fastened to said blade and are positioned to engage said flap means, said positioning being such that the flap means slope upward from said blade means.

6. For attachment to the blade of a rotary lawn mower, rake means comprising hinged means having two parts hinged together, one of said parts being a fixed part adapted to be attached to said blade and the other of said parts being a flap part, wire finger means attached to said flap part and extending downwardly therefrom when mounted on said blade, said flap part being arranged normally to slope upward from said blade when said fixed part is properly attached to said blade.

7. The device of claim 6 in which stop means is attached to said fixed part in position to engage said flap part to stop said flap part from dropping below its normal upward sloping position.

8. The device of claim 7 in which said fixed part and said flap part are held together by a removable pin, said pin being removable so that said hinge may be disassembled and said flap part removed.

* * * * *